(12) United States Patent
Quan et al.

(10) Patent No.: US 12,163,778 B2
(45) Date of Patent: Dec. 10, 2024

(54) MEASURING RULER WITH SELF-LOCKING FUNCTION

(71) Applicants: Guangzhou Xiyin Supply Chain Management Co., Ltd., Guangzhou (CN); Beijing Bowei Hengxin Technology Development Co., Ltd., Beijing (CN)

(72) Inventors: Yingnan Quan, Guangzhou (CN); Zhibo Zhang, Beijing (CN); Bai Yang, Guangzhou (CN); Penghui Chen, Guangzhou (CN); Zhihua Chen, Guangzhou (CN)

(73) Assignees: Guangzhou Xiyin Supply Chain Management Co., Ltd., Guangzhou (CN); Beijing Bowei Hengxin Technology Development Co., Ltd., Beijing (CN)

(*) Notice: Subject to any disclaimer, the term of this patent is extended or adjusted under 35 U.S.C. 154(b) by 270 days.

(21) Appl. No.: 18/045,343

(22) Filed: Oct. 10, 2022

(65) Prior Publication Data
US 2023/0408236 A1 Dec. 21, 2023

(30) Foreign Application Priority Data
Jun. 17, 2022 (CN) .......................... 202221607048.5

(51) Int. Cl.
*G01B 3/10* (2020.01)
*G01B 3/1007* (2020.01)
*G01B 3/1069* (2020.01)

(52) U.S. Cl.
CPC ......... *G01B 3/1007* (2020.01); *G01B 3/1069* (2020.01); *G01B 2003/101* (2013.01)

(58) Field of Classification Search
CPC ............ G01B 3/1007; G01B 2003/101; G01B 2003/1017
USPC ........................................................... 33/767
See application file for complete search history.

(56) References Cited

U.S. PATENT DOCUMENTS

| | | | | |
|---|---|---|---|---|
| 1,945,842 A | * | 2/1934 | Witchger | G01B 3/1005 242/385.4 |
| 2,172,043 A | * | 9/1939 | Wolf | G01B 3/1005 242/379 |
| 3,045,788 A | * | 7/1962 | Cederholm | G01B 3/1041 248/156 |
| 3,273,820 A | * | 9/1966 | Quenot | G01B 3/1005 242/405 |

(Continued)

*Primary Examiner* — George B Bennett
(74) *Attorney, Agent, or Firm* — Steinfl + Bruno LLP

(57) ABSTRACT

A measuring ruler with self-locking function is presented. The ruler includes a shell and a ruler belt that can be pulled out from the shell. A roller and a shaft body are arranged in the shell, the shaft body connected to the shell. The roller is plugged into the shaft body and rotates along the shaft body to drive the ruler belt. The shaft body includes an inner hollow column which can be elastically deformed in the radial direction. The shaft body interacts with a self-locking column that includes a protrusion area with an increased diameter, the protrusion area extending along an axial direction of the column. When the self-locking column is plugged into the shaft body to a locking position, the protrusion area causes the shaft body to deform and widen in the radial direction, so that the roller is clamped and fixated by the shaft body.

14 Claims, 4 Drawing Sheets

(56) References Cited

U.S. PATENT DOCUMENTS

| | | | | |
|---|---|---|---|---|
| 3,443,316 | A * | 5/1969 | Edgell | G01B 3/1005 242/381.3 |
| 3,463,416 | A * | 8/1969 | Quenot | G01B 3/1005 242/396.5 |
| 3,517,780 | A * | 6/1970 | Quenot | G01B 3/1005 242/396.9 |
| 3,731,388 | A * | 5/1973 | Burroughs | G01B 3/12 33/711 |
| 5,768,797 | A * | 6/1998 | Trevino | G01B 3/1005 33/759 |
| 5,894,678 | A * | 4/1999 | Masreliez | G01B 7/026 33/762 |
| 6,131,844 | A * | 10/2000 | Hsu | G01B 3/1005 242/380 |
| 6,467,182 | B2 * | 10/2002 | Usami | G01B 3/1005 33/767 |
| 6,550,155 | B1 * | 4/2003 | Hsu | G01B 3/1005 242/395 |
| 6,868,620 | B2 * | 3/2005 | Sanoner | G01B 3/11 33/763 |
| 7,024,790 | B1 * | 4/2006 | Qilian | G01B 3/1005 242/375.3 |
| 7,178,257 | B2 * | 2/2007 | Kang | G01B 3/1005 33/761 |
| 7,251,904 | B2 * | 8/2007 | Lewis | G01B 3/1041 33/769 |
| 7,458,536 | B2 * | 12/2008 | Hui | G01B 3/1005 242/375.3 |
| 7,703,216 | B2 * | 4/2010 | Huang | G01B 3/1005 33/767 |
| 8,782,917 | B2 * | 7/2014 | Hunsberger | G01B 3/1005 33/767 |
| 2004/0035971 | A1 * | 2/2004 | Li | G01B 3/1005 242/396.6 |

* cited by examiner

MEASURING RULER WITH SELF-LOCKING FUNCTION

CROSS REFERENCE TO RELATED APPLICATIONS

The present application claims priority to Chinese Patent Application No. 2022216070485 filed on Jun. 17, 2022 and incorporated herein by reference in its entirety.

TECHNICAL FIELD

The present application relates to the technical field of measuring technology, and in particular, to a measuring ruler with self-locking function.

BACKGROUND

In the field of clothing manufacturing, a ruler is an essential tool. The traditional (non-electronic) measuring tape has the disadvantages of slow speed and low efficiency. Improvements to the traditional measuring tape have been provided by a prior art electronic ruler. However, in the process of using the electronic ruler, the flexible part of the electronic ruler can't be locked and suspended. When it needs to be locked, the locking button must be firmly pressed by the fingers of a human operator so to overcome a tension generated by an internal spring of the electronic ruler. Upon slight loosening of the fingers of the human operator, the flexible ruler will automatically retract. Therefore, such prior art electronic (flexible) ruler can't accurately and/or reliably maintain a current locking state unless the human operator firmly presses and holds the locking button.

SUMMARY

The present application aims to solve the above technical problems of the prior art and provide a convenient measuring ruler with self-locking function. The measuring ruler of the present application has the advantages of simple structure and low cost.

In order to achieve the above purpose, the technical solution of the present application includes:

A measuring ruler with self-locking function, comprising a shell and a ruler belt that can be pulled out from the shell, a roller and a shaft body being arranged in the shell and the shaft body being connected with the shell, the roller being plugged into the shaft body and rotates around the shaft body to drive the ruler belt winding on the roller; the shaft body comprises a hollow cylindrical column which can be elastically deformed in the radial direction, the shaft body further comprises a self-locking column, and the self-locking column, having an protrusion area, with diameter increasing in the axial direction, when the self-locking column is plugged into the shaft body to a locking position, the protrusion area of the self-locking column causing the shaft body to increase and deform in the radial direction so that the roller is clamped and fixated by the shaft body.

Preferably, the shaft body comprises an inner hollow column with a long incision on a side wall. The function of elastic deformation can be achieved through the long incision on a side wall of the shaft body.

Preferably, the shaft body is configured to connect with the shell, and the inner hollow column of the shaft body forms an opening on a surface of the shell.

Preferably, the measuring ruler comprises a first pressing disc, wherein the pressing disc is connected with one end of the self-locking column, and the self-locking column is plugged into the inner hollow column of the shaft body through the opening formed by the shaft body on a surface of the shell. The first pressing disc is configured to control the position of the self-locking column relative to the inner hollow column and thereby controls the rotation of the roller.

Preferably, the inner hollow column of the shaft body forms an opening that travels through the opposite sides of the shell, a second pressing disc is configured to connect with another end of the self-locking column, and the two pressing discs are respectively arranged at two opposite sides of the shell. The pressing discs and the self-locking column form an structure with I-shaped cross-section. When pressing one end of the pressing discs, the other end of the pressing discs becomes convex, the structure with I-shaped cross-section is easy to operate and control the position of the self-locking column.

Preferably, the protrusion area is a convex block arranged on the self-locking column or an area with increased diameter on the self-locking column.

Preferably, the self-locking column is a column with a longitudinal slip opening on the column's side wall.

Preferably, the pressing disc comprises a first pressing disc and a second pressing disc, wherein the first pressing disc is located on the side close to the upper surface of the roller, and the protrusion area is a convex block arranged on the self-locking column near the first pressing disc.

Preferably, an outer surface of the inner hollow column of the shaft body has a ridged area. The ridged area not only ensures the overall structural strength of the shaft body but also makes the elastic deformation area easier to increase and deform so that the roller can be tightly clamped and fixated.

Preferably, the measuring ruler is an electronic measuring ruler, and the shell comprises an electric control module and a power supply. The setting of electric control module and the power supply enables the electronic measuring ruler to achieve the function of automatic reading and improve the practicability of the measuring ruler.

Compared with the prior art, the present application has the following advantages:

Prior art rulers are internally equipped with elastic parts to make the ruler belt automatically retract into the shell when it is pulled out from the shell. In the present application, the roller is matched with the shaft body to drive the ruler belt to rotate around the roller. The shaft body is an inner hollow column and can undergo elastic deformation and the self-locking column is plugged into the shaft body to control the rotation state of the roller. When the self-locking column is plugged into the locking position, the protrusion area of the self-locking column matches with the elastic deformation section of the shaft body to increase the radial width of the shaft body, so that the shaft body is clamped and the rotation state is restricted to overcome the tension of the elastic parts. At the same time, the ruler belt is also under the locking state and the reading can be suspended for the convenience of users. When the self-locking column is pulled (or pushed) back to make the protrusion area separate from the inner hollow column of the shaft body, and the roller resumes rotation. Through the cooperation between the self-locking column and the shaft body, the rotation state of the roller is quickly controlled which simplifies the overall structure and reduces the manufacturing cost and is easy to implement.

BRIEF DESCRIPTION OF DRAWINGS

Like reference numbers and designations in the various figures indicate like elements.

DETAILED DESCRIPTION

Teachings according to the present application provide methods and structures for a measuring ruler with self-locking function for solving the above problem in the prior art.

In order to make the purpose, features, advantages of the present application clearer and easier to understand, the technical solutions in the embodiments of the present application will be clearly and completely described below with reference to the accompanying drawings in the embodiments of the present application. The described embodiments are only some embodiments of the present application, rather than all the embodiments. Based on the embodiments of the present application, a person of ordinary skills in the art may derive related embodiments without creative efforts.

Figure 1:
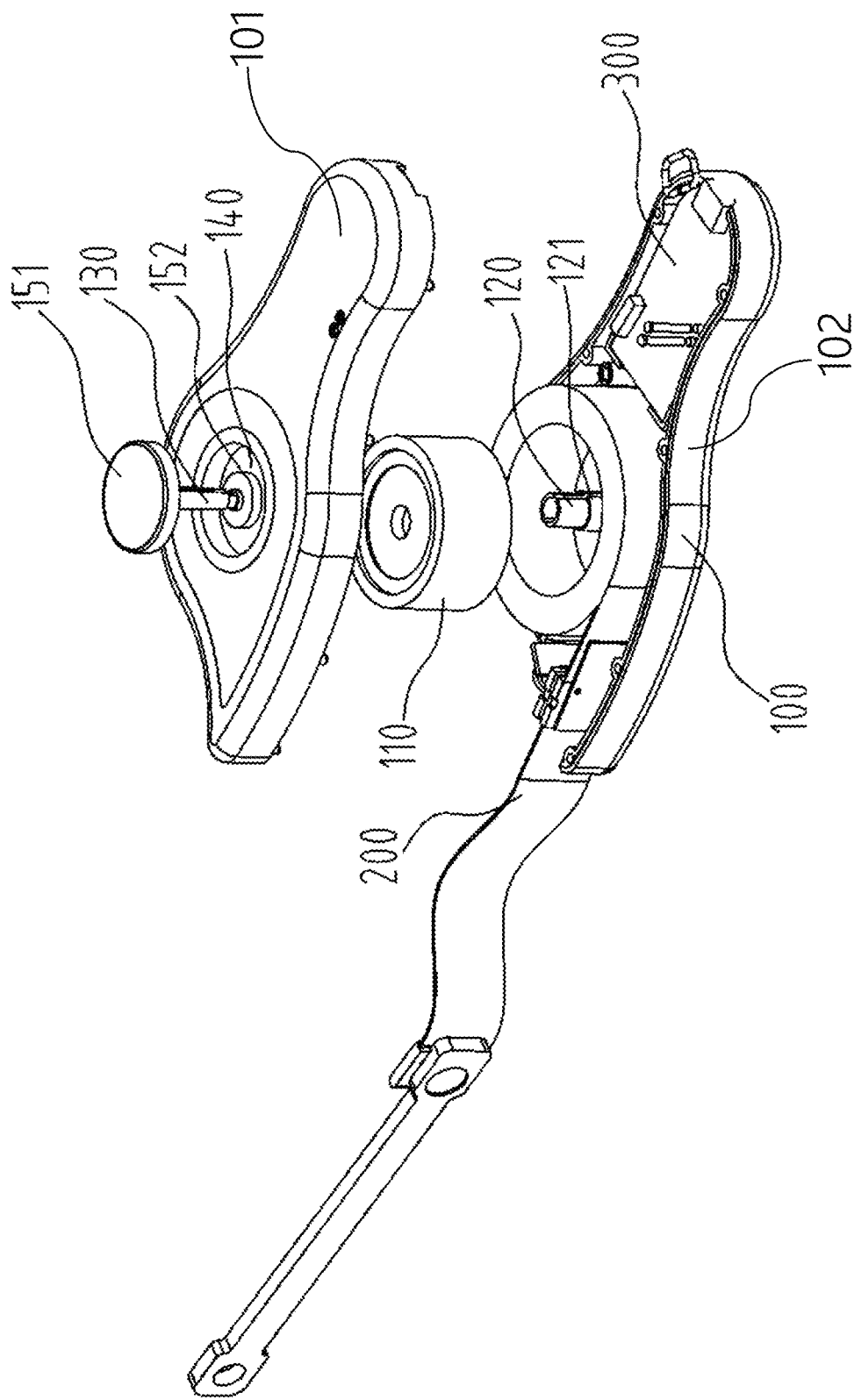
FIG. 1 is a structural decomposition schematic diagram of a measuring ruler with self-locking function provided by a specific embodiment according to the present application.
Figure 2:
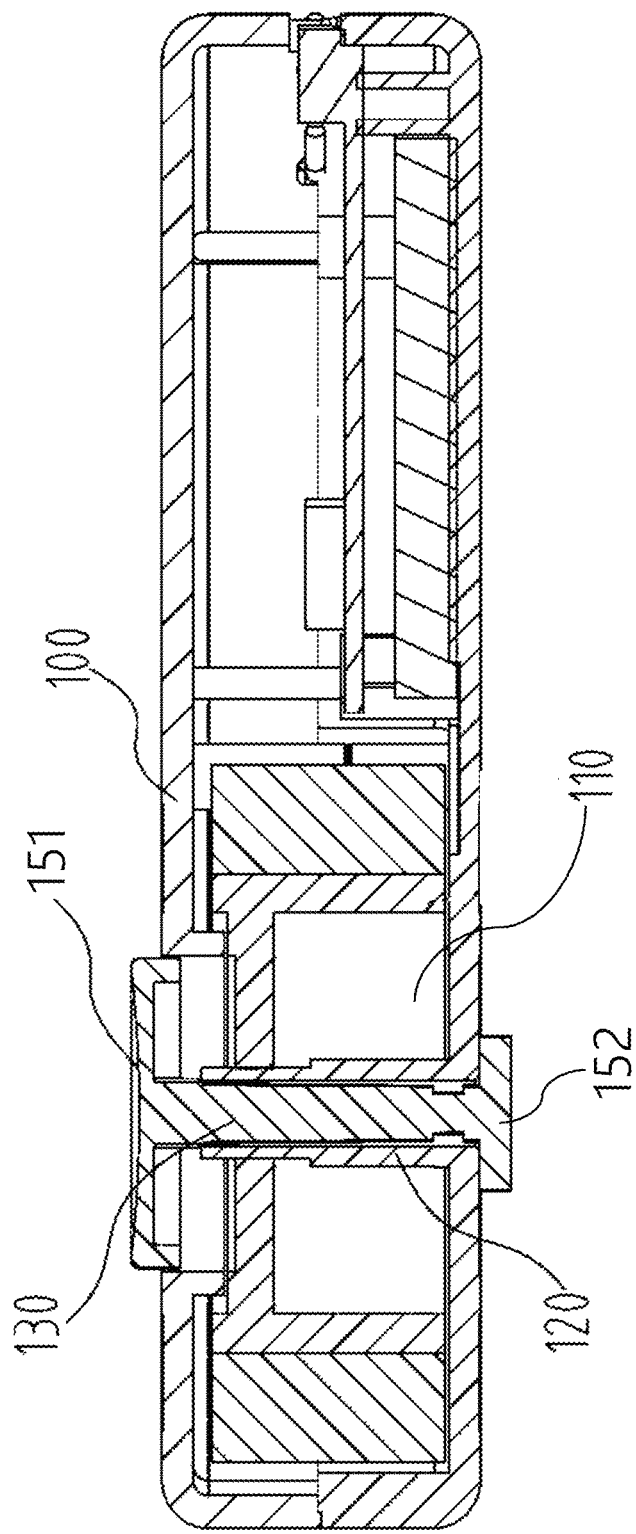
FIG. 2 is a structural cross-sectional view of the roller which is not locked provided by a specific embodiment according to the present application.
Figure 3:
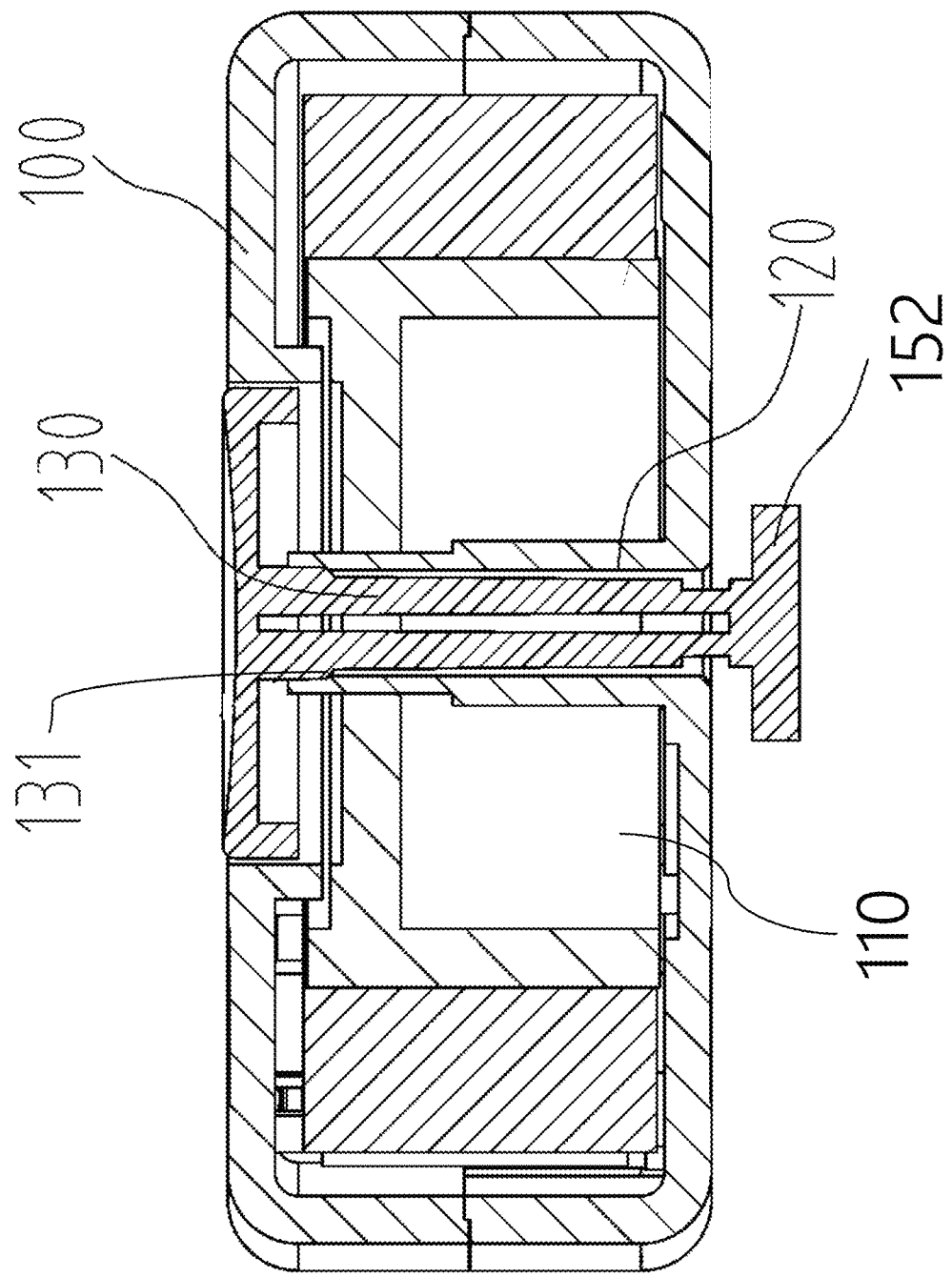
FIG. 3 is a structural cross-sectional view of the roller which is locked provided by a specific embodiment according to the present application.
Figure 4:
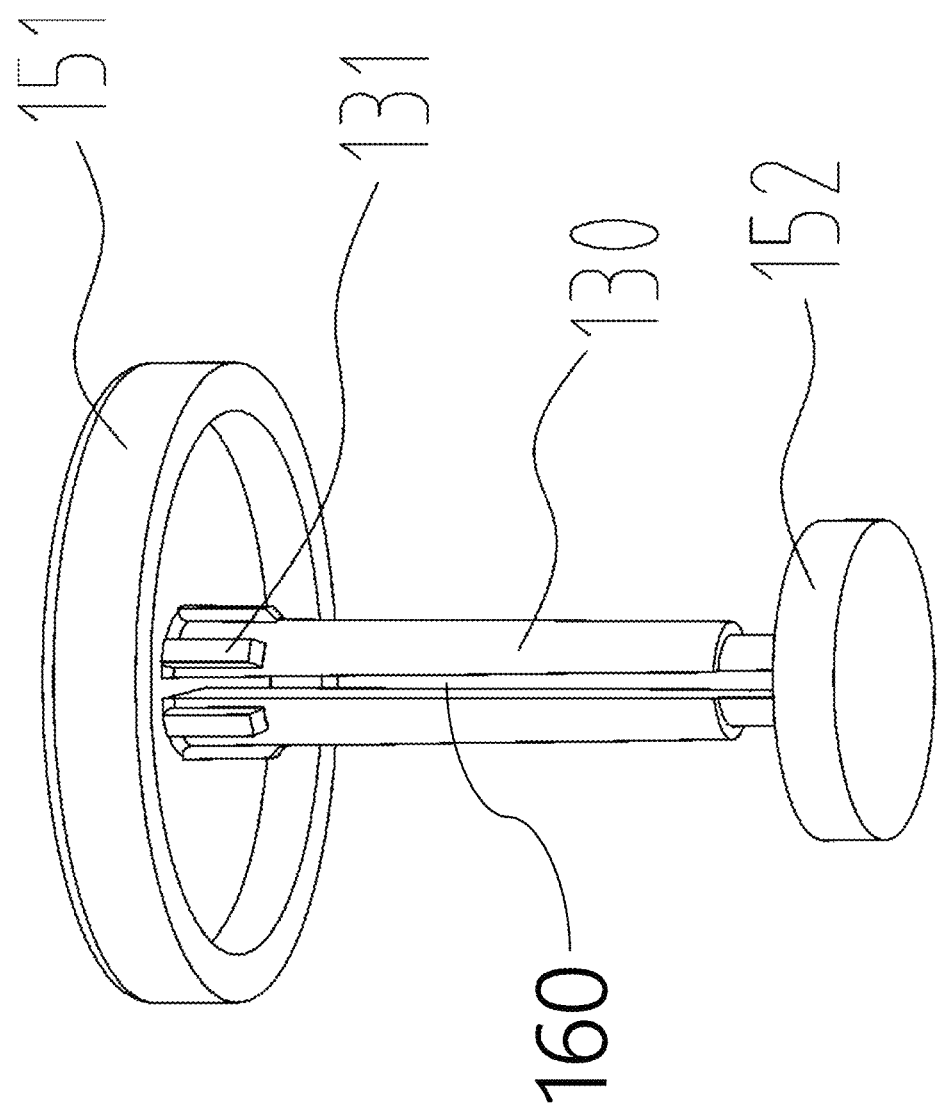
FIG. 4 is a structural schematic diagram of the self-locking column provided by a specific embodiment according to the present application.

As shown in FIG. 1, FIG. 2, FIG. 3 and FIG. 4, the various embodiments of the present application provide a measuring ruler with self-locking function, comprising a shell 100 and a ruler belt 200 that can be pulled out from the shell 100, and a roller 110 and a shaft body 120 are arranged in the shell 100. The shaft body 120 is connected (e.g., fixated) to the shell 100. The roller 110 with a center opening is plugged into the shaft body 120 through the center opening and rotates around the shaft body 120 to drive the ruler belt 200 winding on the roller 110. In other words, the ruler belt 200 can be wound and unwound by rotation of the roller 110 about the shaft body 120. The shaft body 120 includes an inner hollow column which can be elastically deformed in the radial direction. The shaft body 120 is configured to interact with (e.g., coupled to) a self-locking column 130 that includes a protrusion area with an increased diameter, the protrusion area extending along the axial direction (e.g., longitudinal extension) of the self-locking column 130. When the self-locking column 130 is plugged into the shaft body 120 to (reach) a locking position, the protrusion area of the self-locking column 130 causes the shaft body 120 to widen and deform in the radial direction, so that the roller 110 is clamped and fixated by the (widened and deformed) shaft body 120.

The shell 100 is formed by coupling an upper (half, portion of the) shell 101 to a lower shell 102. The shaft body 120 is arranged on the lower shell and is an inner hollow cylindrical column. The middle (e.g., center) of the roller 110 is provided with an opening through which the roller 110 is plugged into the shaft body 120. This allows the roller 110 to rotate around (the axial direction of) the shaft body 120 to drive the ruler belt 200 to rotate on the roller 110. The shaft body 120 is an inner hollow column with a long incision on (and through a full thickness of) a side wall of the inner hollow column so that the inner hollow column of the shaft body 120 can be elastically deformed in the radial direction. The self-locking column 130 is a column which can be plugged into (e.g., slidably coupled to) the inner hollow column of the shaft body 120. The self-locking column 130 has an protrusion area with a profile that corresponds to a profile of the inner hollow column of the shaft body 120, the protrusion area configured to protrude the shaft body 120 to make the shaft body 120 widen and deform in the radial direction, so that the hole of the roller 110 is clamped and fixated by the shaft body 120, thereby locking the position of the roller 110 and therefore of the ruler belt 200.

Prior art measuring rulers are internally equipped with elastic parts to make the ruler belt automatically retract into the shell when it is pulled out from the shell. In stark contrast, the roller 110 according to the present teachings is clamped and fixated by the shaft body 120 to lock the position of the roller 110 and thus overcomes the tension of the elastic parts of the prior art rulers. Accordingly, the locked position of the roller 110 can lock a measurement/reading provided by the ruler belt 200, or in other words, suspend any further measurement/reading. The self-locking function of the measuring ruler can be achieved through cooperation (e.g., interaction) between the self-locking column 130 and the shaft body 120, which simplifies the overall structure and reduces manufacturing cost and implementation complexity of the measuring ruler according to the present teachings.

Furthermore, the shaft body 120 is connected (e.g., fixated) to the shell 100, and the inner hollow column of the shaft body 120 forms an opening through a surface of the shell 100. The connection position between an end of the shaft body 120 and the upper shell 101 forms an opening 140 on the surface of the upper shell 101. After the protrusion area of self-locking column 130 enters the inner hollow column of the shaft body 120, the rotation state of the roller 110 is locked. The self-locking column 130 may also be pulled back to move the protrusion area of the self-locking column 130 out of the inner hollow column of the shaft body 120, and the roller 110 can quickly resume rotation.

Furthermore, the protrusion area may be a convex block 131 (e.g., FIGS. 3-4) arranged (e.g., formed) on the self-locking column 130 or an area with increased diameter on the self-locking column 130. The self-locking column 130 is a column with a longitudinal (e.g., along a longitudinal extension of the column) slit opening 160 on the column's side wall. The slit opening 160 of the self-locking column 130 is convenient for matching with an elastic part. The elastic part in this embodiment is a torsion spring, one end of which is plugged horizontally into the long incision of the shaft body 120, and the other end is fixated on the roller 110. When the ruler belt 200 pulls out the shell 100, the roller 110 rotates to drive the torsion spring to rotate. The torsion spring can drive the ruler belt 200 to pull back to the roller 110 after locking and pulling out the shell 100. The slit opening 160 of the self-locking body is convenient for matching with the torsion spring plugged into the shaft body 120. According to an embodiment of the present disclosure, the protrusion area of the self-locking column 130 comprises a plurality of the convex block 131 arranged at intervals and set (radially) around the column (e.g., along a same axial extension), forming an area with increased diameter. When this area is plugged (e.g., inserted, fitted) into the inner hollow column of the shaft body 120, the shaft body 120 will produce elastic deformation, thus the radial elastic deformation can clamp and fixated the roller 110 to achieve the function of locking the roller 110.

Furthermore, the measuring ruler also comprises a first pressing disc 151, wherein the first pressing disc 151 is connected to the self-locking column 130, and the self-locking column 130 extends into the inner hollow column of the shaft body 120 through the opening 140 formed by the shaft body 120 through the surface of the upper shell 101. The inner hollow column of the shaft body 120 forms a through opening 140 on both sides (e.g., upper and lower shells) of the shell 100. There is a second pressing disc 152, and the two pressing discs 151 and 152 are respectively arranged on both sides (e.g., opposite sides) of the shell 100, and the pressing discs 150 and the self-locking column 130 form a structure having an I-shaped cross-section. The upper and lower shell are both provided with an opening 140, the self-locking column 130 extends into the shaft body 120 through the opening 140 of the upper shell. Since both ends of the inner hollow column of the shaft body 120 are through (a respective) opening 140, the self-locking column enters the shaft body 120 from the opening 140 at one end and extends out of the shaft body 120 from the opening 140 at the other (e.g., opposite) end, and is connected to the second pressing disc 152. The first pressing disc 151 is located on a side close to the upper end (e.g., proximate the upper shell) of the roller 110, and the protrusion area is a convex block arranged on the self-locking column 130 close to (e.g., proximate) the first pressing disc 151. The first pressing disc 151 is located at the upper end of the measuring ruler (e.g., end defined by the upper shell) and matches with the opening 140 of the upper shell. The convex block 131 of the self-locking column 130 is located at the side close to the first pressing disc 151. When pressing the first pressing disc 151, the convex block 131 is pushed into the inner hollow column of the shaft body 120 to generate elastic deformation that increases the radial size at the position of the convex block 131. The hole in the middle of roller 110 is clamped and fixated by the increased radial size, therefore locking the rotation state of the roller 110. At the same time, the second pressing disc 152 protrudes out of the shell 100. When unlocking the rotation state of the roller 110, press the second pressing disc 152 to travel against the shell 100 and promote the convex block 131 to break away (e.g., pull out) from the shaft body 120, and the elastic deformation of the shaft body 120 can recover so that the roller 110 is free to rotate without being clamped and fixated by the shaft body 120.

Furthermore, the outer side of the inner hollow column of the shaft body 120 has a ridged area 121. An outer contour of the middle part of the shaft body 120 is provided with a step that defines a lower end and an upper end of the shaft body 120, wherein a radial size of the lower end increases with respect to a radial size of the upper end to form a coarsening area (e.g., outer contour region). The ridged area 121 not only ensures the overall structural strength of the shaft body 120 but also makes the elastic deformation area matched with the roller 110 easier to achieve the self-locking function.

Furthermore, the measuring ruler is an electronic measuring ruler, and the shell 100 is provided with an electric control module 300 and a power supply. The setting of electric control module 300 and the power supply enables the electronic measuring ruler to achieve the function of automatic reading by connecting with the mobile device terminal, and the reading is accurate, which improves the practicability of the measuring ruler.

According to the disclosure and teaching of the above specification, those skilled in the art in the present application can further make changes and modifications to the above embodiments. Therefore, the present application is not limited to the specific embodiments disclosed and described above, and some modifications and changes to the present application should also fall within the protection scope of the claims of the present application. In addition, although some specific terms are used in this specification, these terms are only for the convenience of description and do not constitute any limitation to the present application.

The invention claimed is:

1. A measuring ruler with self-locking function, comprising a shell and a ruler belt that can be pulled out from the shell, a roller and a shaft body being arranged in the shell and the shaft body being connected with the shell, the roller being plugged into the shaft body and rotates around the shaft body to drive the ruler belt winding on the roller;

the shaft body being an inner hollow column which can be elastically deformed in a radial direction relative to an axial direction of the shaft body, the shaft body being equipped with a self-locking column, the self-locking column having a protrusion area with diameter increasing in the axial direction, when the self-locking column is plugged into the shaft body to a locking position, the protrusion area of the self-locking column causes the shaft body to elastically deform in the radial direction so that the roller is clamped by the shaft body.

2. The measuring ruler with self-locking function according to claim 1, wherein when the shaft body elastically deforms, a width of a portion of the shaft body in the radial direction increases.

3. The measuring ruler with self-locking function according to claim 1, wherein the shaft body is an inner hollow column with a long incision on a side wall of the inner hollow column.

4. The measuring ruler with self-locking function according to claim 3, wherein the long incision is through a full thickness of the side wall.

5. The measuring ruler with self-locking function according to claim 1, wherein the shaft body is connected to the shell, and the inner hollow column of the shaft body forms an opening through a surface of the shell.

6. The measuring ruler with self-locking function according to claim 5, wherein the measuring ruler further comprises one or more pressing discs connected to the self-locking column, and the self-locking column extends into the inner hollow column of the shaft body through the opening formed by the shaft body.

7. The measuring ruler with self-locking function according to claim 6, wherein the inner hollow column of the shaft body forms a through opening on both sides of the shell, the one or more pressing discs comprises two pressing discs respectively arranged on either sides of the shell, and the two pressing discs and the self-locking column form a structure with I-shaped cross-section.

8. The measuring ruler with self-locking function according to claim 1, wherein the protrusion area is an area with increased diameter on the self-locking column.

9. The measuring ruler with self-locking function according to claim 8, wherein the protrusion area comprises one or more convex blocks radially arranged on the self-locking column.

10. The measuring ruler with self-locking function according to claim 1, wherein the self-locking column is a column with a longitudinal slit opening on a side wall of the self-locking column.

11. The measuring ruler with self-locking function according to claim 7, wherein the two pressing discs comprises a first pressing disc and a second pressing disc, wherein the first pressing disc is located on a side of the shell close to an upper end of the roller, and the protrusion area is a convex block arranged on the self-locking column close to the first pressing disc.

12. The measuring ruler with self-locking function according to claim 1, wherein an outer side of the inner hollow column of the shaft body has a ridged area.

13. The measuring ruler with self-locking function according to claim 12, wherein the ridged area comprises a step that defines a lower end and an upper end of the shaft body, wherein a radial size of the lower end increases with respect to a radial size of the upper end.

14. The measuring ruler with self-locking function according to claim 1, wherein the measuring ruler is an electronic measuring ruler, and the shell is provided with an electric control module and a power supply.

* * * * *